United States Patent [19]
Washburn et al.

[11] 4,253,376
[45] Mar. 3, 1981

[54] TERMINATION ACCUMULATOR

[75] Inventors: William J. Washburn, Capistrano Beach; Clifford E. LaFever, Mission Viejo; Hugh B. Thompson, Santa Ana, all of Calif.

[73] Assignee: Ford Motor Company, Dearborn, Mich.

[21] Appl. No.: 42,161

[22] Filed: May 24, 1979

[51] Int. Cl.³ .............................................. F41D 10/04
[52] U.S. Cl. .................................. 89/33 BB; 198/347
[58] Field of Search .............. 89/33 BB, 33 BC, 33 C, 89/33 CA, 34; 198/347

[56] References Cited
U.S. PATENT DOCUMENTS

| | | | |
|---|---|---|---|
| 2,993,415 | 7/1961 | Panicci et al. | 89/33 D |
| 3,296,930 | 1/1967 | Rocha | 89/33 CA |
| 3,618,454 | 11/1971 | Christenson | 89/33 BB |
| 3,670,863 | 6/1972 | Meier et al. | 89/33 BC |
| 3,724,324 | 4/1973 | Zielinski | 89/34 |
| 3,747,469 | 7/1973 | Ashley et al. | 89/33 BB |

Primary Examiner—Stephen C. Bentley
Attorney, Agent, or Firm—Steven L. Permut; Clifford L. Sadler

[57] ABSTRACT

A termination accumulator for a machine gun has a handling conveyor passing through a supply channel, a bypass channel, and a return channel. The supply channel leads to a feed system of a machine gun. The bypass channel has its other end connected to a return conveyor leading from the feed system. A gate is mounted at the junction of the bypass channel and supply channel operably between two positions, one position directs ammunition on the handling conveyor onto a supply conveyor leading to the feed system and a second position directs ammunition on the handling conveyor through the bypass channel. Upon release of a trigger mechanism operably connected to the gun, the gate moves from its first position to a second position such that the feed system continues its forward operation to clear itself of any live ammunition therein. The handling conveyor maintains a forward mode directing ammunition in to the bypass channel. A reversing mechanism reverses the handling conveyor to retrieve live ammunition from the bypass channel after the feed system is cleared of all live ammunition such that the live ammunition accumulated in the termination accumulator can be then fed to the feed system during the next operation of the machine gun.

6 Claims, 4 Drawing Figures

TERMINATION ACCUMULATOR

BACKGROUND OF THE INVENTION

1. Field of the Invention

This invention relates to a termination accumulator for an article handling system particularly for use with a rapid fire machine gun.

2. Description of the Prior Art

In rapid fire machine guns, particularly ones with fixed multiple barrels live ammunition may remain in one of the firing chambers or in the feed system directly aligned with the fire chamber after every burst. When the gun is not in use, ammunition remains in the feed system directly behind the firing chamber. Gunners commonly expend the last rounds of ammunition after use to ensure that the firing chambers and the feed system of the gun are empty for transport.

Many storage and feed systems have been developed to accommodate linkless ammunition. U.S. Pat. No. 2,993,415 issued to Pannicci et al on July 25, 1961, U.S. Pat. No. 3,618,454 issued to Christenson on Nov. 9, 1971, U.S. Pat. No. 3,670,863 issued to Meier et al on June 20, 1972, U.S. Pat. No. 3,724,324 issued to Zielinski on Apr. 3, 1973, and U.S. Pat. No. 3,747,469 issued to Ashley et al on July 24, 1973 are five references disclosing various double ended linkless ammunition conveyor systems.

With linkless ammunition being developed, ammunition is supplied to the gun through an endless conveyor belt. The gun designed with the endless conveyor is capable of taking much greater ammunition loads. With the increase in ammunition loads, expending of the last rounds of ammunition after each burst is impractical as well as a waste. Few systems have been devised to clean the firing chamber and feed system after every burst without the need to expend all the remaining rounds of ammunition.

The M-61 type rapid fire gun has a safety system which holds the bolts of the feed system in an aft dwell position to prevent further rounds from entering the firing chamber. All ammunition in the process of being rammed is then fired and spent cartridge is returned to the magazine hand off. However, in the process, several unfired rounds are positioned in the feed system behind each of the barrels. In addition, the unfired rounds contained behind the barrels are returned to the magazine during the next burst without being fired resulting in a waste of live ammunition.

General Electric has developed a gun, model no. GAU-8, which has a feature that stops the firing pin from falling when the trigger is released. The rounds in the process of being rammed are rammed and extracted by the bolts without being fired. When the gun and feed system are stopped, the feed system is reversed to clear the gun feed system. The feed system is cycled backward until the last unfired round is repositioned at the entry to the feed system. In this reversing process, the ammunition is rechambered and extracted without being fired again. This system results in the double chambering of live ammunition and the rechambering of spent cases.

SUMMARY OF THE DISCLOSURE

According to the invention, a termination accumulator is operably connectable to an article handling system having an inlet, outlet, and work station. The accumulator has a supply conveyor section operably connectable to an intake of the article handling system. The accumulator includes a bypass channel with one end operably connected to the supply conveyor section and is preferably connected at an opposing end to a return conveyor section. The return conveyor section is preferably operably connectable to an outlet of the article handling system for receiving articles therefrom. A gate means positioned along the supply conveyor is operable between two positions for allowing passage of articles from the supply conveyor to the article handling system when the gate means is in the first position and for diverting artiles to the bypass channel when the gating means is in a second position preventing passage of articles to the handling system.

Means sequentially advance articles in the article handling system to the work station and sequentially advance the supply conveyor whereby the gate means when in its second position directs all articles to the bypass channel and the work station receives all the articles which previously passed the gate means into the article handling system.

In one embodiment, a single handling conveyor forms the supply conveyor section, a conveyor section passing through the bypass channel and the return conveyor section. Preferably a reversing means for reversing the direction of the handling conveyor returns articles in the bypass channel to the supply conveyor section such that articles returned to the supply conveyor section are supplied to the feed system during the next operation of the work station.

Further, according to the invention, an automatic machine gun has a feed system for feeding ammunition to at least one firing chamber, and a supply conveyor section for supplying ammunition to the feed system. A gating means along the supply conveyor section allows ammunition to pass from the supply conveyor section when the gating means is in the first position and for preventing live ammunition from entering the feed system when the gating means is in its respective second position. An actuating means moves the gating means to its second position such that continued forward operation of the feed system will feed all live ammunition therein to the firing chamber where the ammunition is fired thereby emptying the feed system of all live ammunition.

A bypass channel is connected to the supply conveyor section adjacent the gating means for receiving ammunition from the supply conveyor section when the gating means is in its respective second position. The bypass channel is of sufficient length to accommodate all ammunition passed therein while the ammunition in the feed system is being fired.

In this fashion, the device allows for the emptying of the feed system at the end of an operation cycle of an article handling system, particularly a machine gun, where the retention of live ammunition in the feed system presents a risk of accidental discharge of ammunition.

BRIEF DESCRIPTION OF THE DRAWINGS

Reference now will be made to the following drawings in which.

DETAILED DESCRIPTION OF THE PREFERRED EMBODIMENT

Figure 1:
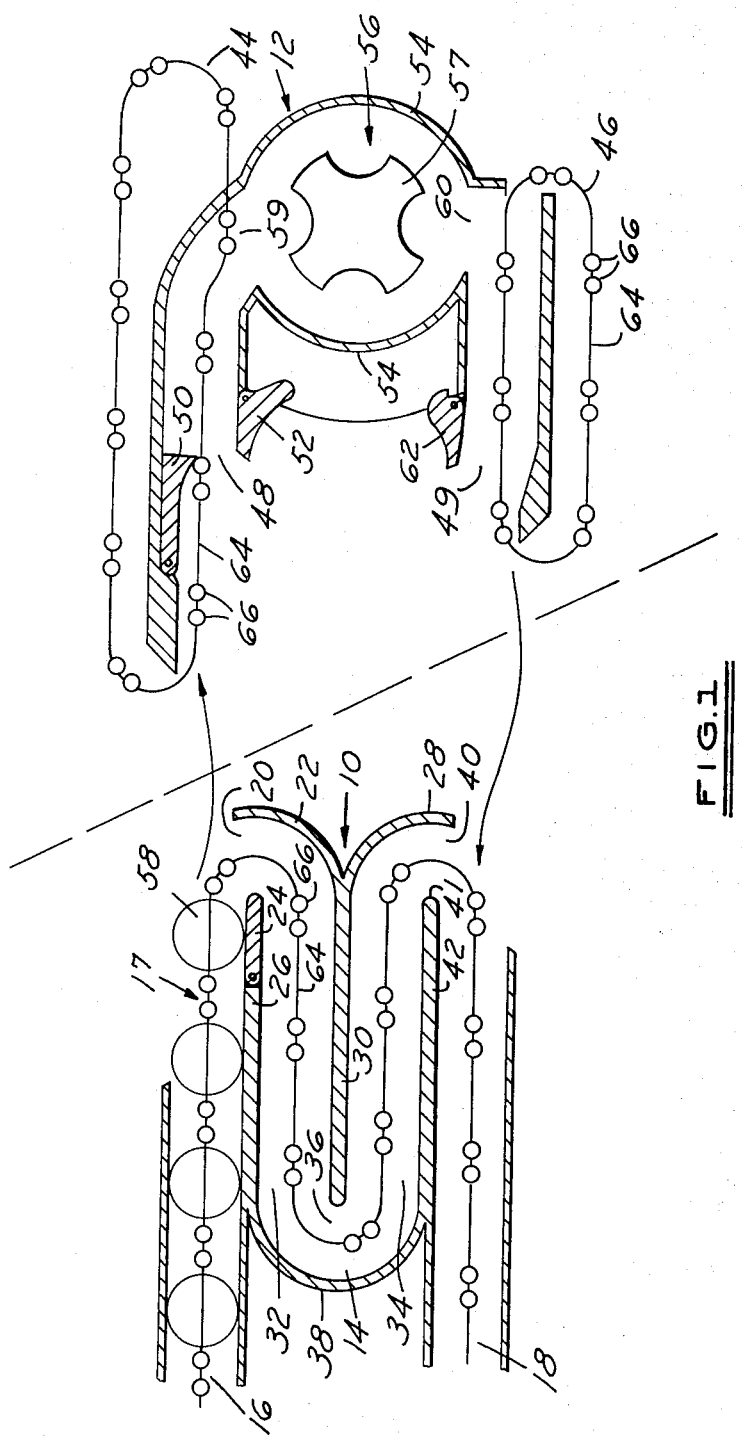
FIG. 1 is a partially schematic, exploded, elevational view of an embodiment of the invention.

Referring particularly to FIG. 1, the termination accumulator 10 is connectable to a feed system 12. The feed system 12 can, for example, be part of a gun. The gun is illustrative of one use of the feed system 12 and terminating accumulator 10. The termination accumulator 10 and feed system 12 can be used for other article handling systems which handle individual linkless articles in rapid sequence.

The termination accumulator 10 comprises a convoluted bypass channel 14 fitted between a supply portion 16 of conveyor 17 and return portion 18 of conveyor 17. Conveyor 17 threads through bypass channel 14.

The bypass channel 14 has an entrance 20 between upward flanged wall 22 and a gate member 24. The gate member 24 is pivotably mounted at the end of wall 26 for movement between a first and second position. Upward flanged member 22 merges with a downwardly extending flange member 28 to form a straight walled section 30 that separates the top portion 32 from bottom portion 34 of bypass channel 14. The center wall 30 terminates at a point spaced from an arched wall member 38 to form an opening 36 which allows conveyor 17 to pass from the top portion 32 of channel 14 to the bottom portion 34 thereof. Arched wall member 38 extends from wall member 26 to bottom wall member 42. Bypass channel 14 has exit 40 positioned between downward flanged wall 28 and end 41 of wall member 42.

Figure 2:
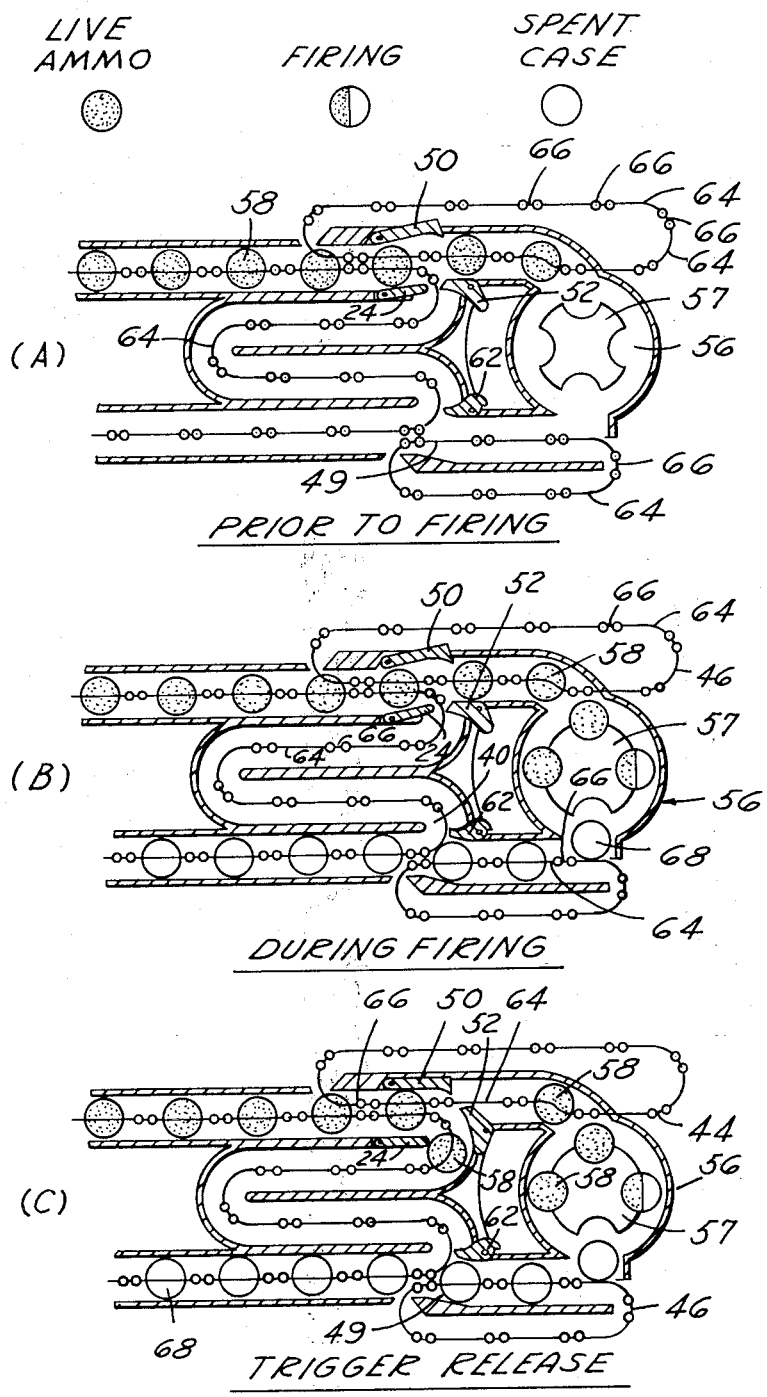
FIGS. 2(A)–(C) shows the embodiment shown in FIG. 1 in three sequential operations.
Figure 3:
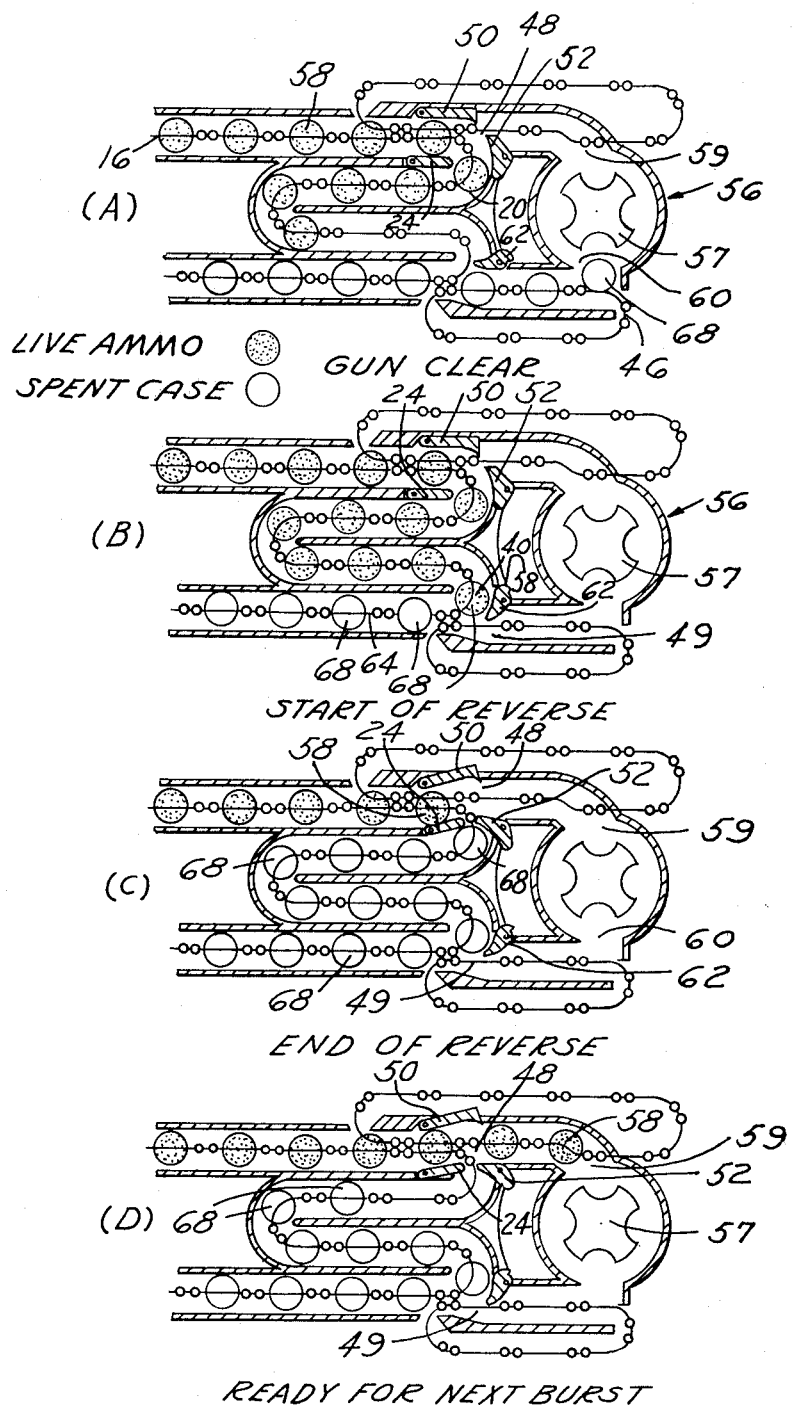
FIGS. 3(A)–(D) show four sequential operations of the termination accumulator following the three sequential operations shown in FIGS. 2(A)–(C).

The supply conveyor position 16 is operably connected to a feed system 12. The feed system includes a feed conveyor 44 and an output conveyor 46 preferably interconnected with the conveyor 17. The feed conveyor 44 overlaps the supply portion 16 of conveyor 17 just above gate member 24 while output conveyor 46 interconnects with the return portion 18 of conveyor 17 just below exit 40 as clearly shown in FIGS. 2 and 3. Feed conveyor 44 passes through inlet 48 which is situated between a second and third gate member 50 and 52 respectively.

Gate members 50 and 52 are pivotally mounted to housing 54 of a feed system 12 for movement between a first and second position.

Housing 54 has a work station 56 mounted therein. The work station 56 illustrated includes a rotating sprocket 57 aligned to the rear of the gun's firing chambers. The work station 56, when in the machine gun, is an aligning and ramming system which takes live ammunition 58, fires it, returns the spent cartridges 68 to the work station 56 for delivery through a discharge passage 60 and onto output conveyor 46. For sake of simplicity the raming, firing and retrieval system of the work station are not shown. Other conventional work stations can be compatible with the termination accumulator 10.

Merging gate member 62 is spring mounted to housing 54 adjacent to output conveyor 46 for toggle action between a first and second position.

Each conveyor 17, 44 and 46, is compartmentalized with individual spaces 64 situated between spacers 66. The bypass channel 14 is long enough to accommodate eight compartment spaces 64 of conveyor 17. In addition, the feed system 12 from inlet 48 to outlet 49 is designed to hold eight rounds of ammunition.

The operation of the termination accumulator 10 and article handling system 12 can best be described by reference to FIGS. 2(A)–(C), 3(A)–(D), and 4. Ammunition 58 is supplied by the supply portion 18 of conveyor 17. Gate members 24, 50 and 52 are in a first position such that entrance 20 is blocked while inlet 48 is opened. Ammunition 58 in spaces 64 of conveyor 17 are handed off to the spaces 64 of feed conveyor 44 passing through inlet 48. During firing as shown in FIG. 2(B), the conveyor 17, the feed 44 and output conveyor 46 and the work station 56 are in a forward moving mode so that ammunition from the conveyor 44 is passed through the work station 56 where the ammunition is fed to a firing chamber (not shown) and fired. The empty cartridge 68 is extracted back from the firing chamber to sprocket 57 and passed onto the output conveyor 46 which passes the spent cartridges 68 to the return portion of conveyor 17 through outlet 49. Merge gate member 62 is pivoted to first position to block exit 40.

Figure 4:
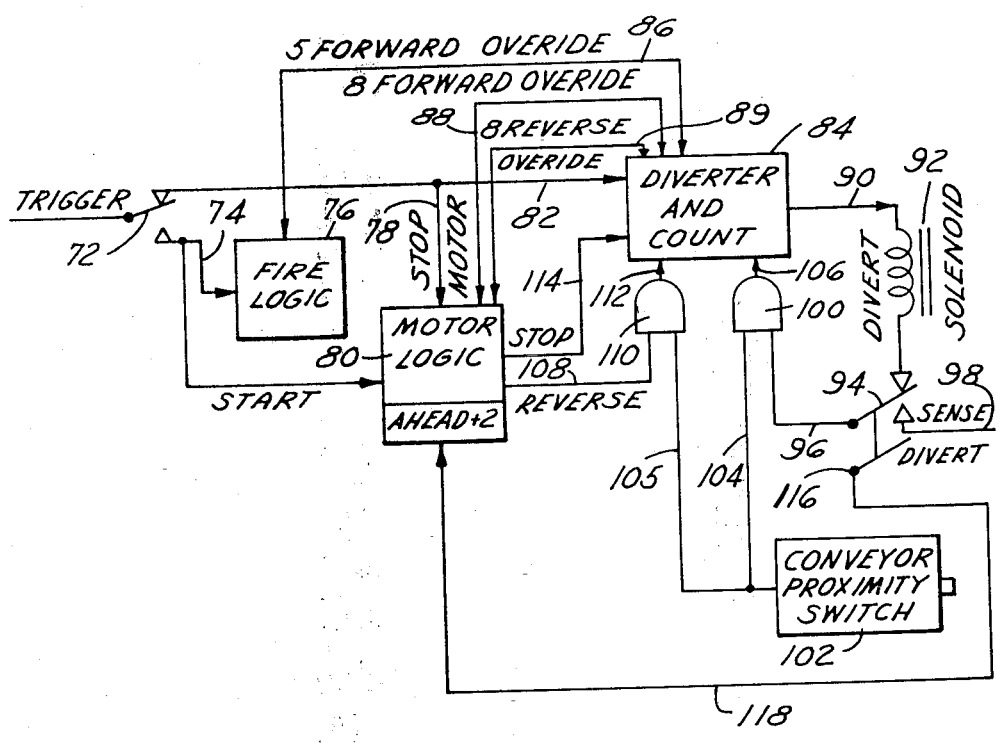
FIG. 4 is a schematic of the logic controls for the termination accumulator shown in FIGS. 1 through 3.

The gate members 24, 50 and 52 are operably connected to a solenoid 70 as shown in FIG. 4. The solenoid is electrically connected to trigger 72 to move the gates 24, 50, and 52 to their respective first positions when the trigger 72 is pressed and to their respective second positions when the trigger 72 is released to block off inlet 48 while opening up entrance 20 to the bypass channel 14.

When the trigger 72 is released, the conveyors 17, 44 and 46 and work station 56 continue to operate in their forward mode passing the ammunition already past inlet 48 through the work station 56 to be fired and to return the spent cartridges 68 to return conveyor portion 18 past outlet 49. As shown in FIGS. 2(C) and 3(A), while the ammunition is being fired and the spent case 68 being returned to the conveyor 46, the supply portion 16 of conveyor 17 continues to supply live ammunition 58. However, the live ammunition 58 is diverted through entrance 20 into bypass channel 14.

As shown in FIGS. 3(A)–(D), the gun is cleared, the spent cartridges 68 are continued to be delivered onto the return portion 18 of conveyor 17 and live ammunition is diverted into bypass channel 14. Bypass channel fills up with live ammunition 58 and passes by the toggle action merging gate 62 thereby camming merging gate 62 into its second position which opens up exit 40 and closes off outlet 49. The last spent cartridge 68 is deposited on the last empty space 64 of conveyor 17 before live ammunition 58 passes from the bypass channel to the return portion 18. In this fashion, any risk of jamming of the gun caused by two cartridges wanting to be in the same position of the conveyor is minimized.

Conveyors 17, 44 and 46 are then reversed whereby the live ammunition on the return portion 18 and the bypass channel 14 are returned to the supply portion 16. The empty cartridges 68 enter the bypass channel 14 through the exit 40 until the lead round of ammunition 50 is returned to the supply portion of conveyor 17.

At the end of the reverse cycle, the bypass channel 14 is filled with eight rounds of spent cartridges 68. The conveyor 17 and conveyor 44 and 46 are then advanced two spaces so that a live ammunition 58 is positioned just outside the intake 59 to the work station 56. At this point in time, the gun maintains an idle position until the trigger is pressed.

The schematic of the logic control which controls the positions of the gate, the timing and direction of the conveyor motions and the firing of the final rounds of ammunition is illustrated in FIG. 4. The release of trigger 72 shuts off the main signal along line 74 to the fire logic 76 which controls the ramming lugs and firing pins (not shown) and sends a stop signal along line 78 to motor logic 80 which controls the conveyor and sprocket 57. However the machine gun does not immediately stop due to the signal along line 82 sent to a diverter and counter 84, which causes an overriding output signal of five forward sequences along line 86 to the fire logic 76 and eight forward sequences to the motor logic 80 along line 88 followed by eight reverse sequences along line 89. In other words, the feed mechanism is advanced eight sequences with only the first five sequences including the firing operation. Subsequently, the feed system is reversed eight sequences.

Also upon release of trigger 72, the diverter and counter 84 sends an output signal along line 90 to solenoid 92 which controls the position of gates 24, 50 and 52. When the solenoid is actuated to move the gates 24, 50 and 52 to their respective second positions, a switch 94 is closed to connect line 96 to a signal source 98 to send an input signal to gate 100. A conveyor proximity switch 102 is positioned anywhere along supply portion 16 of conveyor 17 and is actuated by each passing round of ammunition 58. For each actuation of switch, a signal is passed along line 104 to AND gate 100 and an output signal passes from AND gate 100 to diverter and counter 84. The diverter and counter 84 senses up to eight forward sequences and then sends out a reverse signal along line 89.

In the reverse mode, the motor logic 80 sends out a signal along line 108 to AND gate 110. Upon reversal of conveyor 17, the proximity switch 102 again produces a signal for each passing round of ammunition which passes along line 104 and also line 105. In the reverse mode, AND gates 100 and 110 both produce output signals along lines 106 and 112 respectively. The diverter and counter 84 sense each pair of signals and when eight pairs of signals are received, stops sending signals along line 89 which causes motor logic 80 to stop and cause solenoid 92 to deactuate so that gates 24, 50 and 52 are repositioned back to their first position.

Upon deactuation of solenoid 92 and return of gates 24, 50 and 52, to their first position, a signal switch 116 is closed to send a signal along line 118 to allow the motor logic to go ahead two spaces as shown in FIG. 3(D) to prepare the gun for the next burst of ammunition.

One advantage of the termination accumulator is that it does not endanger a gunner if a second burst of ammunition is quickly needed before the termination cycle is completed. Upon actuation of the trigger, motor logic 80 sends a signal along line 114 to stop the diverter and counter and deactuate solenoid 92 to reposition the gate members 24, 50 and 52 immediately back to their first position which allows live ammunition to enter the work station and be fired. Even if the termination cycle is not completed and live ammunition is in the bypass channel, live ammunition can be immediately fed to sprocket 57 in work station 56. The live ammunition left in the bypass channel during the commencement of the second burst is sent through the bypass channel to the return conveyor section without being fired.

Upon a second release of the trigger mechanism at the end of the second burst, the gun will automatically follow the same procedure as described before in clearing the feed system 12 of any live ammunition while diverting live ammunition fed from the supply portion 16 of conveyor through the bypass channel 14 and then going into a reverse mode to return the diverted live ammunition back to the supply portion 16 and forward the leading rounds to the intake 59 for preparation of the next burst of ammunition.

Variations and modifications of the invention are possible without departing from the spirit and scope of the invention which is defined by the appended claims.

We claim: The embodiments of the invention in which an exclusive property or privilege is claimed are defined as follows:

1. In an automatic machine gun having a feed system for feeding ammunition to at least one firing chamber,
   a supply conveyor section for supplying ammunition to the feed system, and a trigger mechanism for actuating said gun, the improvement comprising:
   a bypass means to receive ammunition from said supply conveyor section;
   a gating means operably moveable between two positions;
   said gating means constructed for allowing ammunition to pass from the supply conveyor section to the feed system when in the first position and for diverting ammunition from the supply conveyor section to the bypass means thereby preventing live ammunition from entering the feed system when in the second position;
   means for moving the gating means to the first and second positions;
   said trigger mechanism operably connected to said moving means for positioning said gating means in its second position upon release of said trigger mechanism;
   means for continuing forward operation of the feed system upon release of said trigger mechanism until all ammunition in the feed system has been fired;
   said bypass means having sufficient capacity to accommodate ammunition diverted therein from said supply conveyor section while the ammunition in the feed system is being fired after release of said trigger mechanism;
   the supply conveyor section constructed for continuing forward movement when the gating means is moved to its second postiion to supply ammunition to the bypass means during forward operation of the feed system until all ammunition therein has been fired.

2. An automatic machine gun as defined in claim 1 further comprising;
   a return conveyor section leading from the feeding system for transporting spent ammunition therefrom, the return conveyor section being partitioned into compartments, each compartment sized to receive one round of ammunition; the bypass means being connected at one end to the return conveyor section;
   the bypass means comprises a channel with a conveyor section passing therethrough;
   said bypass conveyor section being of sufficient length to accommodate the same number of rounds of ammunition as the number of rounds of ammunition and spent ammunition in the feed system between the points where the bypass means connects to the supply conveyor section and where the bypass means connects to the return conveyor section such that each compartment of the return conveyor section receives a single round of ammunition from either the bypass means or the feed system.

3. An automatic machine gun as defined in claim 2 comprising;
   a reversing means for reversing the direction of the bypass conveyor section and supply conveyor section to return ammunition in the bypass conveyor section to the supply conveyor section such that ammunition returned to the supply conveyor section is supplied to the feed system during the next burst of ammunition.

4. An automatic machine gun as defined in claim 3 wherein the reversing means reverses direction of the return conveyor section;
   a second gating means is mounted at the junction of the bypass conveyor section to the return conveyor section diverting said spent ammunition to said bypass means thereby preventing spent ammunition that is on the return conveyor section from being sent back through the outlet of the feed system.

5. An automatic machine gun as defined in claim 2 or 4 wherein a single handling conveyor belt forms the supply conveyor section, bypass conveyor section and return conveyor section;
   said handling conveyor belt constructed into sequentially spaced compartments, each compartment receiving a single round of linkless ammunition;
   said handling conveyor belt operably positioned adjacent a feed conveyor belt which receives ammunition from said handling conveyor belt at said supply conveyor section when said gating means are in their first position
   said feed conveyor belt feeds said ammunition to said firing chambers;
   said handling conveyor belt operably positioned adjacent an output conveyor belt which receives spent ammunition from said firing chambers and conveys it and passes it onto said return conveyor section of said handling conveyor belt;
   said bypass conveyor section being convoluted between said supply conveyor section and said return conveyor section.

6. A termination accumulator for an article handling system having an inlet, outlet and work station, said accumulator comprising;
   a supply conveyor means operably connectable to an intake of the article handling system;
   a return conveyor means operably connectable to an outlet of the article handling system for receiving articles therefrom;
   a bypass channel including a conveyor means operably connected at one end to the supply conveyor means adjacent the gating means and at an opposing end to the return conveyor means;
   a gating means operable between two positions for allowing passage of articles from the supply conveyor means to the handling system when the gating means are in a first position for preventing passage of articles to the work station and diverting said articles to the bypass channel when the gating means are in a second position;
   means for sequentially advancing the articles in the article handling system to the work station and sequentially advancing the supply conveyor means;
   a termination switch to deactuate said article handling system;
   said gate means operably connected to said termination switch to move to said second position upon actuation of said switch;
   said advancing means connected to said termination switch to continue to advance said articles after said termination switch is actuated such that the work station receives all the articles that passed the gate means and the bypass conveyor means receives articles from the supply conveyor means;
   reversing means for reversing the supply conveyor means and bypass conveyor means such that articles on the bypass conveyor means are returned to the supply conveyor means when the article handling system is empty whereby articles returned to the supply conveyor means are supplied to the article handling system during the next forward operation of the article handling system;
   a second gating means mounted at the junction of the bypass channel and return conveyor means for diverting said articles on said return conveyor means to said bypass channel, thereby preventing articles passed from the work station to the return conveyor to pass back into said work station.

* * * * *

UNITED STATES PATENT AND TRADEMARK OFFICE
CERTIFICATE OF CORRECTION

PATENT NO. : 4,253,376
DATED : March 3, 1981
INVENTOR(S) : William J. Washburn, et al.

It is certified that error appears in the above-identified patent and that said Letters Patent are hereby corrected as shown below:

On the title page where it states "Assignee", - cancel "Ford Motor Company, Dearborn," and insert therefor -- Ford Aerospace and Communications Corporation, Detroit --.

Column 1, line 43, "cartridge is" should read -- cartridges are --.

Column 2, line 12, "artiles" should read -- articles --.

Column 3, line 37, "position" should read -- portion --.

Column 5, line 62, "immedidately" should read -- immediately --.

Column 6, line 12, please delete "We claim:"

Claim 1, line 47, "postiion" should read -- position --.

Claim 6, line 18 should continue without interruption from line 17.

Signed and Sealed this

Twenty-first Day of September 1982

[SEAL]

Attest:

GERALD J. MOSSINGHOFF

Attesting Officer

Commissioner of Patents and Trademarks